United States Patent
Laddu et al.

(10) Patent No.: US 11,917,589 B2
(45) Date of Patent: Feb. 27, 2024

(54) URLLC ENHANCEMENT WITH MULTI-TRP/PANEL/BEAM USING FDM

(71) Applicant: NOKIA TECHNOLOGIES OY, Espoo (FI)

(72) Inventors: Keeth Saliya Jayasinghe Laddu, Espoo (FI); Yuk Youngsoo, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 331 days.

(21) Appl. No.: 17/436,259

(22) PCT Filed: Mar. 28, 2019

(86) PCT No.: PCT/US2019/024640
§ 371 (c)(1),
(2) Date: Sep. 3, 2021

(87) PCT Pub. No.: WO2020/197564
PCT Pub. Date: Oct. 1, 2020

(65) Prior Publication Data
US 2022/0167329 A1    May 26, 2022

(51) Int. Cl.
*H04W 72/044*    (2023.01)
*H04L 1/08*    (2006.01)
*H04L 5/00*    (2006.01)
*H04W 72/23*    (2023.01)

(52) U.S. Cl.
CPC ............ *H04W 72/044* (2013.01); *H04L 1/08* (2013.01); *H04L 5/0048* (2013.01); *H04W 72/23* (2023.01)

(58) Field of Classification Search
CPC ............... H04W 72/044; H04W 72/23; H04W 72/0453; H04L 1/08; H04L 5/0048; H04L 1/0025; H04L 1/0003; H04L 1/0009; H04L 5/0035; H04L 5/0044; H04L 5/0053; H04L 5/0094
See application file for complete search history.

(56) References Cited

U.S. PATENT DOCUMENTS

2022/0124768 A1\*    4/2022    Frenne ...................... H04L 1/08

OTHER PUBLICATIONS

Office Action dated Jun. 24, 2022, corresponding to European Patent Application No. 19745327.7.
International Search Report and Written Opinion dated Nov. 21, 2019 corresponding to International Patent Application No. PCT/US2019/024640.

(Continued)

*Primary Examiner* — Dady Chery
(74) *Attorney, Agent, or Firm* — Robert P. Michal, Esq.; Carter, DeLuca & Farrell LLP

(57) ABSTRACT

In accordance with some embodiments, a method may include configuring, by a user equipment, at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

16 Claims, 6 Drawing Sheets

(56) References Cited

OTHER PUBLICATIONS

3GPP TS 38.211 V15.4.0 (Dec. 2018), Technical Specification, 3rd Generation Partnership Project; Technical Specification Group Radio Access Network; NR; Physical channels and modulation (Release 15), Dec. 2018.

3GPP TS 38.212 V15.4.0 (Dec. 2018), Technical Specification, 3rd Generation Partnership Project; Technical Specification Group Radio Access Network; NR; Multiplexing and channel coding (Release 15), Dec. 2018.

3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018.

3GPP TS 38.214 V15.4.0 (Dec. 2018), Technical Specification, 3rd Generation Partnership Project; Technical Specification Group Radio Access Network; NR; Physical layer procedures for data (Release 15), Dec. 2018.

Huawei et al., "Discussion on multi-TRP/panel transmission for reliability and robustness in NR," 3GPP Draft; R1-1809118, 3GPP TSG RAN W1 Meeting #94, Gothenburg, Sweden, Aug. 20-24, 2018.

Zte, "Enhancements on multi-TRP/Panel transmission," 3GPP Draft; R1-1901634, 3GPP TSG RAN WG1 #96, Athens, Greece, Feb. 25-Mar. 1, 2019, Feb. 16, 2019, XP051599331.

Intel Corporation, "On multi-TRP/multi-panel transmission," 3GPP Draft; R1-1902502, 3GPP TSG RAN WG1 Meeting #96, Athens, Greece, Feb. 25- Mar. 1, 2019, Feb. 16, 2019, XP051600198.

Nokia et al., "Enhancements on Multi-TRP/Panel Transmission," 3GPP Draft; R1-1902563, 3GPP TSG RAN WG1 #96 Meeting, Athens, Greece, Feb. 25-Mar. 1, 2019, Feb. 16, 2019, XP051600257.

InterDigital Inc., "Performance Evaluation of Multi-TRP Schemes," 3GPP Draft; R1-1902614, 3GPP TSG RAN WG1 Meeting 96, Athens, Greece, Feb. 25-Mar. 1, 2019, Feb. 16, 2019, XP051600307.

Oppo, "Enhancements on multi-TRP and multi-panel transmission," 3GPP Draft; R1-1902701, 3GPP TSG RAN WG1 Meeting #96, Athens, Greece, Feb. 25-Mar. 1, 2019, Feb. 15, 2019, XP051600396.

Qualcomm Incorporated, "Multi-TRP Enhancements," 3GPP Draft; R1-1903043, 3GPP TSG-RAN WG1 Meeting #96, Athens, Greece, Feb. 25-Mar. 1, 2019, Feb. 16, 2019, XP051600739.

Samsung, "Revised WID: Enhancements on MIMO for NR," 3GPP Draft; RP-182067, 3GPP TSG RAN Meeting #81, Gold Coast, Australia, Sep. 10-13, 2018.

* cited by examiner

Figure 4

401 — configuring, by a user equipment, at least a first transmission configuration index (TCI), a second TCI, and at least two non-overlapping frequency resource regions in a single time domain resource

Figure 5

501 — transmitting, by a network entity, at least one configuration to a user equipment with at least a first transmission configuration index (TCI), a second TCI, and at least two non-overlapping frequency resource regions in a single time domain resource

URLLC ENHANCEMENT WITH MULTI-TRP/PANEL/BEAM USING FDM

BACKGROUND

Field

Certain embodiments may relate to communication systems. For example, some embodiments may relate to transmission reception points.

Description of the Related Art

3rd Generation Partnership Project (3GPP) Release (Rel)-16 includes enhancements to new radio (NR) multiple input multiple output (MIMO), where multi-transmission reception point (TRP) provides critical benefits for enhanced mobile broadband (eMBB) operations, as well as improving reliability for ultra reliable low latency communication (URLLC) services.

SUMMARY

In accordance with some embodiments, a method may include configuring, by a user equipment, at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include means for configuring at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include at least one processor and at least one memory including computer program code. The at least one memory and the computer program code can be configured to, with the at least one processor, cause the apparatus to at least configure at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, a non-transitory computer readable medium can be encoded with instructions that may, when executed in hardware, perform a method. The method may include configuring at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, a computer program product may perform a method. The method may include configuring at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include circuitry configured to configure at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, a method may include transmitting, by a network entity, at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include means for transmitting at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include at least one processor and at least one memory including computer program code. The at least one memory and the computer program code can be configured to, with the at least one processor, cause the apparatus to at least transmit at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, a non-transitory computer readable medium can be encoded with instructions that may, when executed in hardware, perform a method. The method may include transmitting at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, a computer program product may perform a method. The method may include transmitting at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

In accordance with some embodiments, an apparatus may include circuitry configured to transmit at least one configuration to a user equipment with at least a first transmission configuration index (TCI), a second TCI, and at least two non-overlapping frequency resource regions in a single time domain resource. The first TCI may be associated with at least one non-overlapped frequency resource region. The second TCI may be associated with at least one non-overlapped frequency resource region which not assigned to the first TCI. At least one association of a state of the first TCI, a state of the second TCI, and the at least one non-overlapping resource region may be changed in a next time domain repetition instance.

BRIEF DESCRIPTION OF THE DRAWINGS

For proper understanding of this disclosure, reference should be made to the accompanying drawings, wherein:

FIG. 4 illustrates an example of a method performed by a user equipment according to certain embodiments.

FIG. 5 illustrates an example of a method performed by a network entity according to certain embodiments.

DETAILED DESCRIPTION

Figure 1:
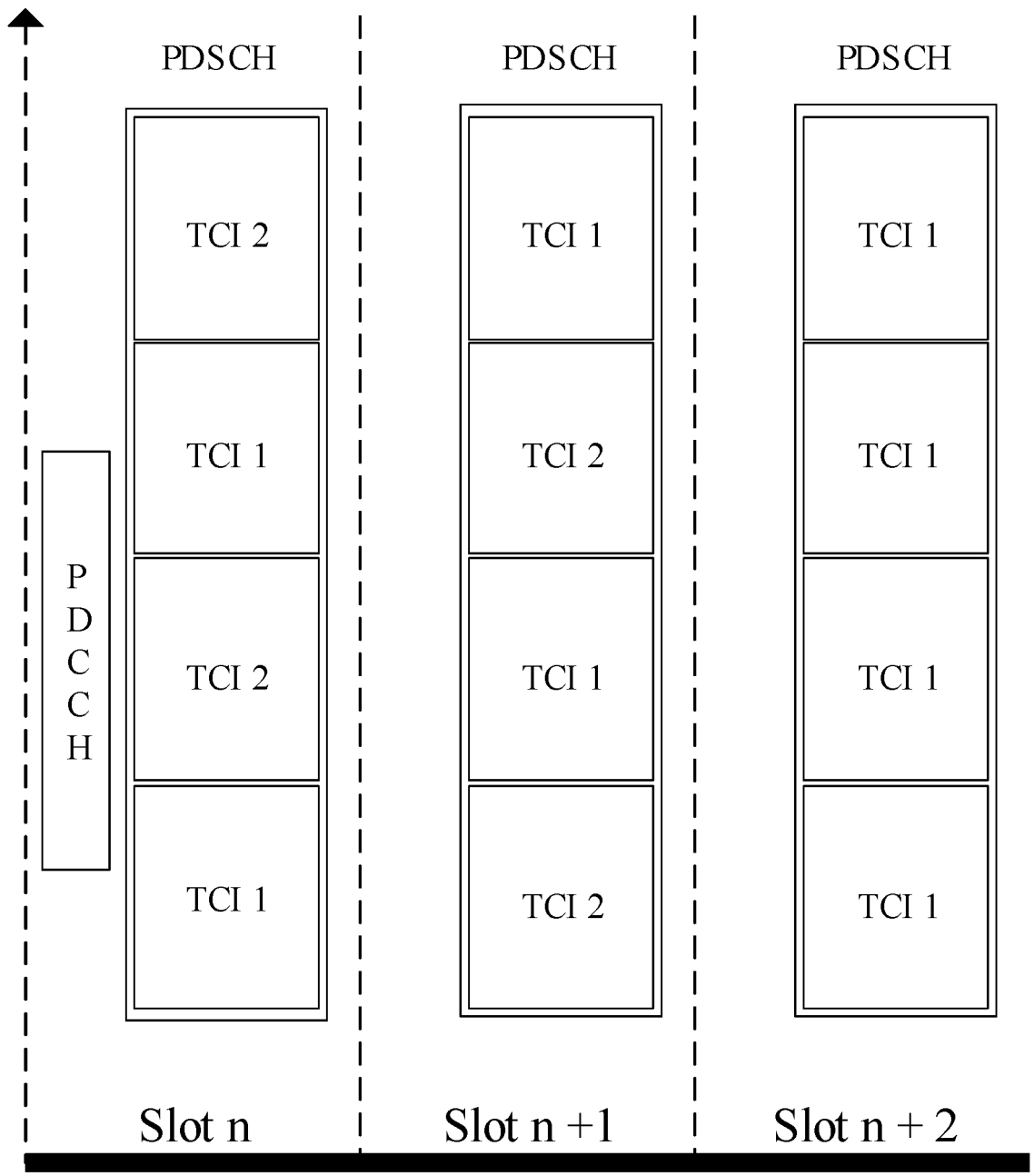
FIG. 1 illustrates an example of preconfigured TCI association patterns for each repetition according to certain embodiments.

3GPP Rel-16 includes enhancements to MIMO by specifying downlink control signalling enhancements for efficient support of non-coherent joint transmission, as well as enhancements on uplink control signalling and reference signals for non-coherent joint transmission. Rel-16 also includes multi-TRP techniques for URLLC requirements.

Certain diversity-based transmission schemes may provide improved reliability and robustness. Since URLLC requirements are now associated with multi-TRP discussions, the techniques proposed in single TRP scenarios, such as PDSCH repetition, may be extended to multiple TRPs in order to meet the reliability targets. Compared with single TRP PDSCH repetition, diversity may be used to send the same information from multiple TRPs. With channels differing from each TRP, multi-TRP repetition may provide higher spatial diversity, and as a result, improved reliability.

RAN1 discusses URLLC enhancements, as well as several schemes identified for further consideration. Specifically, for multi-TRP specification support for URLLC, at least one of several schemes has been identified for transmitting the same transport block from multiple TRPs. Scheme 1 (SDM) involves TCI states within a single slot with overlapping time and frequency resource allocation ($n(n<=N_s)$), while scheme 2 (FDM) involves TCI states within the single slot with non-overlapping frequency resource allocation (($n(n<=N_f)$). In addition, scheme 3 (TDM) considers TCI states within the single slot with non-overlapping time resource allocations ($n(n<=N_{t1})$), and scheme 4 (TDM) considers TCI states with K different slots. It remains undetermined whether to support mini-slot PDSCH repetitions, signalling mechanisms, how the schemes apply for FR1 and FR2, and whether the number of repetitions may be larger than the number of TCI states (n).

Multi-TRP may be considered separately with respect to single vs multiple DCIs, ideal vs non-ideal backhaul, same codeword vs different codewords, layer mapping, and many other combinations. As an example, URLLC scenarios for PDSCH reliability enhancements may include optimized backhaul between TRPs, and/or single DCI to schedule the repetition of the same TB.

When considering single DCI and frequency division multiplexing (FDM) types of resource allocation between TRPs, each TRP may use non-overlapping resources to transmit a transport block (TB). The same TB may be repeated by the other TRP with a different redundancy version (RV). However, this may lead to a higher code rate for each transmission when compared to a single TRP transmission with the full frequency domain resource allocation. Therefore, there are limited advantages from this type of FDM scheme even with multiple TRPs. Moreover, the links between the UE and multiple TRPs may need to have comparable quality for multi-TRP transmission to be effective. If one link is much weaker than the other link, single-TRP transmission may be more suitable than the multi-TRP transmission considering the spectral efficiency due to the use of the same MCS over all links, where MCS is determined based on the reported CQI of the weaker link. With a single DCI, challenges arise when indicating different MCSs for different TRPs since the DCI payload sizes may increase by adding more MCS fields, which may lead to a deteriorated control channel performance. Performance loss may occur as compared to a single TRP transmission, such as dynamic point selection (DPS).

The same TB may be scheduled by the full resource allocation as a technique for avoiding the disadvantages of FDM schemes, where each TRP may transmit one portion of the resources in the frequency domain, and another portion may be transmitted by the other TRP. This may allow TBs to be transmitted with a much lower code rate with diversity gain from two TRPs. However, this scheme may also lose frequency diversity which may be achieved by a single TRP from using a much wider frequency allocation.

3GPP R1-1809118 discusses using different redundancy versions at different TRPs to improve overall performance. Specifically, the UE may receive one data stream from TRP1, and a different redundancy version (RV) from TRP2. When different versions of the same data are received jointly, the UE may combine them at the physical layer. It was also discussed that higher layer parameters may configure the number of repetitions, and PDSCH repetitions may be transmitted across consecutive slots using the same time-frequency resource allocation. Moreover, the repetitions may be retransmissions since they may be associated with a sequence of redundancy versions indicated by DCI to allow soft combining of the PDSCH repetitions. In addition, 3GPP R1-1903043 considers using different frequency allocations in different TRPs, where the same TB may be transmitted with disjoint RBs. This scheme considers single TB, single RV, and single MCS, but different frequency allocations in the transmission.

Certain embodiments described herein may optimize certain schemes associated with using multiple TRPs described above to transmit a single TB with a larger frequency domain resource allocation. Specifically, reliability enhancements based on TRP diversity and frequency domain/time diversity gains may be obtained when repeating the same TB. With the traditional FDM types of scheme, self-decoding of the TB may be challenging, whereas certain embodiments described herein overcome this disadvantage by allowing the decoding of the TB even when one TRP is in a blockage scenario across multiple time instances. This kind of blocking may be common in FR2.

In addition, from the perspective of the UE, there is no difference between single TRP or multi-TRP transmissions when considering decoding the codeword. Channel estimation part may be different from the single TRP due to the use of different TCI states, but would remain unaffected by physical layer processing components. At the TRP side, TCI state may change over time for particular resource allocations, and TRP may transmit only one portion of the frequency at a given time instance, which is consistent with Rel-15 mechanisms. Certain embodiments are, therefore, directed to improvements in computer-related technology, specifically, by conserving network resources and reducing power consumption of network entities and/or user equipment located within the network.

Figure 6:
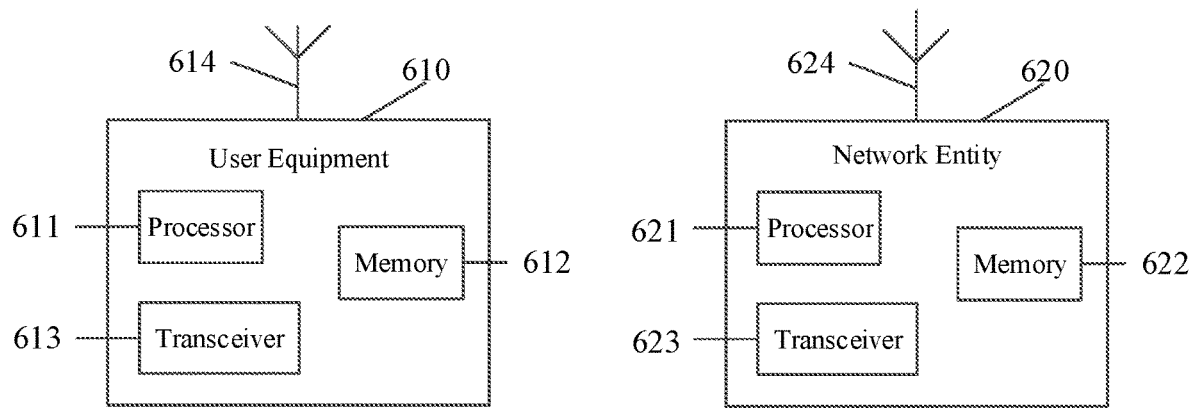
FIG. 6 illustrates an example of a system according to certain embodiments.

FIG. 4 illustrates an example of a method performed by a user equipment, such as UE 610 in FIG. 6. In step 401, the UE may configure at least a first transmission configuration index (TCI), a second TCI, and at least two non-overlapping frequency resource regions in a single time domain resource. Each TCI may be associated with at least one non-overlapped frequency domain allocation or at least one multiple non-overlapped frequency domain resource allocation. The first TCI may be associated with at least one non-overlapped frequency resource region, and the second TCI may be associated with at least one non-overlapped frequency resource region which not assigned to the first TCI. The relation between each non-overlapped frequency resource and corresponding TCI state may be changed across slots and/or time domain repetition instances. For example, at least one association of a state of the first TCI, a state of the second TCI, and the at least one non-overlapping resource region may be changed in a next time domain repetition instance.

In some embodiments, each TRP (or panel/beam) may use one or more non-overlapping frequency resources, with one TCI state for multi-TRP transmissions in a time instance, and the same or some other set of non-overlapping frequency resources in a different time instance (repetition of the same TB) with the same (or different) TCI state.

Figure 2:
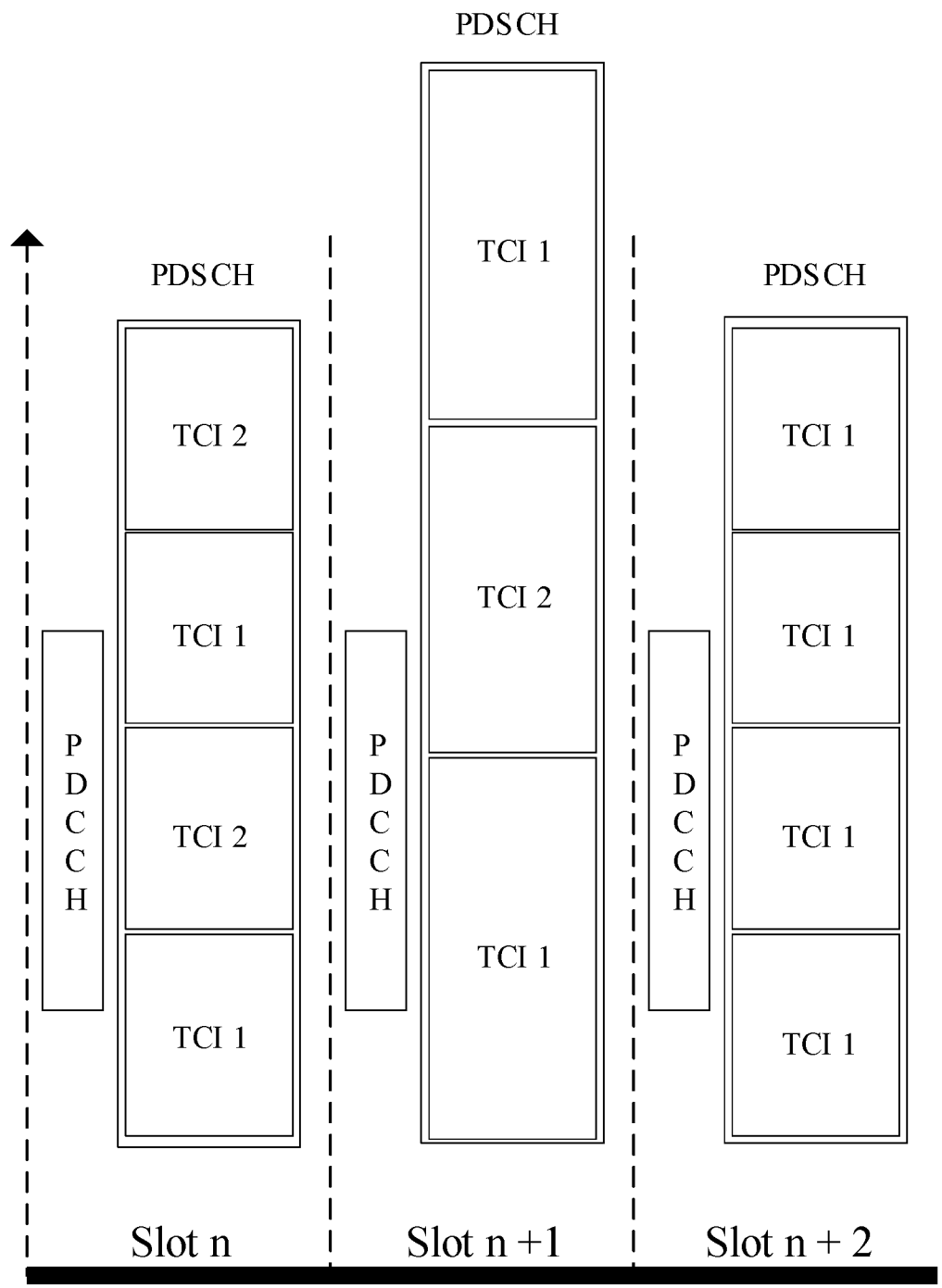
FIG. 2 illustrates an example of dynamic TCI association patterns for each repetition according to certain embodiments.

In various embodiments, the relation between each non-overlapped frequency resource and corresponding TCI state of a TB repetition in a time instance may be transmitted to the UE as a configuration either by a preconfigured pattern, as illustrated in FIG. 1, or dynamically based on the scheduled resources and/or MCS and/or defined TCI association for the transmission, as illustrated in FIG. 2. These are discussed in further detail below.

With a preconfigured TCI association, as shown in FIG. 1, partitioning of an entire frequency resource allocation may be configured by higher layer signalling. As an example, if the DCI indicated frequency allocation is 60 PRB, and two TRPs use two non-adjacent frequency allocations, 15 PRB may be the portioning size of the non-overlapped frequency allocation, but each TRP uses two portions. These portions may be each related to one TCI state, where at least one TCI association of each portion in one TRP may be performed based on a higher layer configuration, such as an RRC configured bit map configured to indicate whether a TCI is used in a given portion or not.

In some embodiments, portion size may be derived based on at least one dynamic signalling, such as a bit map, received at the UE. For example, if the full band is 60 PRB, and UE receives a bit map '101,' the UE may assume 20 PRB portions, with the first and third portions associated with TRP1, and the second portion associated with TRP2.

In various embodiments, TCI state used by one TRP may be the same across different time instances. Additionally or alternatively, the TCI state used by one TRP may change (indicated as a semi-static manner) across different time instances, and the UE may interpret the correct TCI state based on both association information and TCI state used by the TRP. For example, if the full band is 60 PRB, and the UE receives a bit filed "101" in the first slot and "1010" in the second slot, the UE may receive a semi-static indication that TCI1, TCI2 (by TRP1 and TRP2, respectively) may be used in the first slot, while TCI, TCI3 (TRP1 and TRP2) may be used in the second slot. In this case, in the first slot, the UE may assume 20 PRB portions, where the first and third portions may be associated with TRP1 (with TCI1), and the second portion may be associated with TRP2 (with TCI2). In the second slot, the UE may assume 15 PRB portions, where the first and third portions may be associated with TRP1 (with TCI1), and the second and fourth portions may be associated with TRP2 (with TCI3).

With a dynamic TCI association, as shown in FIG. 2, multiple options for partitioning of the full frequency resource allocation and TCI association may be configured using higher layer signaling, and/or at least one dynamic indication may trigger one of those options. In certain embodiments, each DCI may carry a bit map to derive the TCI association with resource portions, as well as related information to derive the number of portions. It may also be possible to change the full resource allocation and size of each portion in a more dynamic manner.

In various embodiments, the same or different single/multiple DMRS ports may be associated with some or all non-overlapped frequency resource allocations. Furthermore, within each time domain instance, such as slot or time domain allocation, a single codeword with one redundancy version (RV) may be used across full resource allocation or multiple codewords, with the same TB, while multiple RVs may be used on the allocated resources, with the same TCI, to each TRP.

In some embodiments, when a single codeword with one redundancy version (RV) is used across full resource allocation, the first TRP may use at least one TCI state, at least one associated resource allocation, while the second TRP may use at least one different TCI state and at least one corresponding resource allocation. Furthermore, the full resource allocation may be used in the TBS determination with single MCS (or two MCS/modulation orders) and/or common overhead assumptions.

Figure 3:
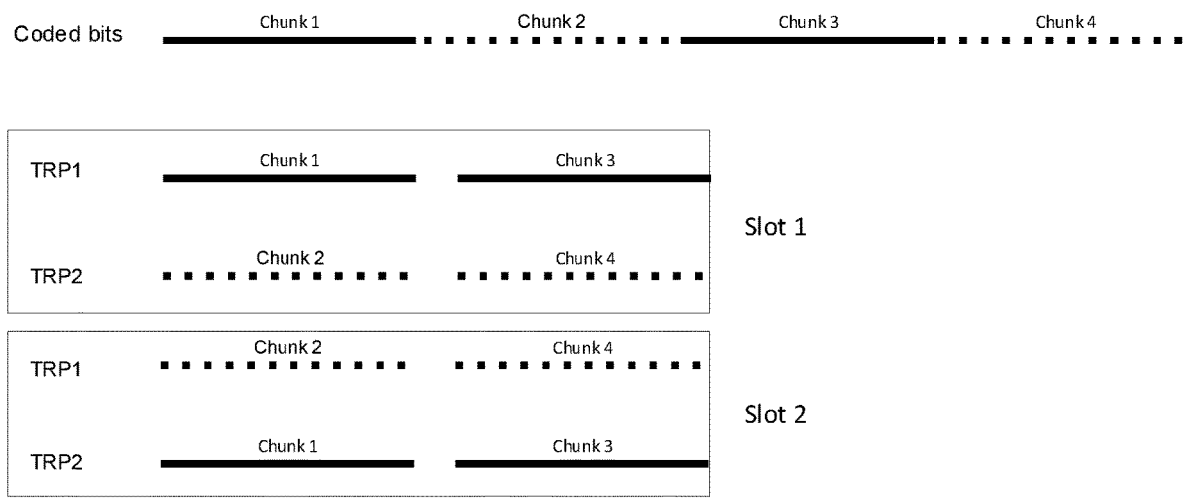
FIG. 3 illustrates an example of interleaving of coded bits seen at each TRP according to certain embodiments.

With respect to TRP, a subset of the total coded bits may be mapped to the resources allocated to the TRP, where at least one portion of the coded bits (or modulated symbols) are interleaved among two TRPs. For each time domain repetition, the interleaving pattern may be changed based on the TCI-resource allocation associations, as illustrated in FIG. 3. The interleaving pattern change may also associate with the same chunk size or a different chunk size across different time domain repetitions.

In some embodiments, when multiple codewords with the same TB and with multiple redundancy versions are used on the resources allocated with the same TCI to each TRP, the first TRP may use a TCI state and at least one associated resource allocation, and/or the second TRP may use a different TCI state and at least one corresponding resource allocation. Additionally or alternatively, at least one first resource allocation may be used in the TBS determination with the first MCS with overhead assumptions which may come from the first TRP or an average from both TRPs. The second resource allocation may use a different MCS/modulation order, but the TBS determination can be based on the first TRP. From the perspective of the TRP, each codeword may be mapped to the resources allocated to the TRP. For each and every repetition, if the resource allocations associated with TCI pattern per TRP varies, a different set of coded bits may be mapped to the resources allocated to the TRP. Meanwhile, from the UE from the UE perspective, separate resource block mapping (each mapping follows Rel-15) may be applied across a set of frequency resource allocation which has one TCI state.

FIG. 5 illustrates an example of a method performed by a network entity, such as network entity 620 in FIG. 6. In step 501, the network entity may transmit at least one configuration to a user equipment, which may also be similar to UE 610 in FIG. 6, with at least a first transmission configuration index (TCI), a second TCI, and at least two non-overlapping frequency resource regions in a single time domain resource. Each TCI may be associated with at least one non-overlapped frequency domain allocation or at least one multiple non-overlapped frequency domain resource allocation. The first TCI may be associated with at least one non-overlapped frequency resource region, and the second TCI may be associated with at least one non-overlapped frequency resource region which not assigned to the first TCI. The relation between each non-overlapped frequency resource and corresponding TCI state may be changed across slots and/or time domain repetition instances. For example, at least one association of a state of the first TCI, a state of the second TCI, and the at least one non-overlapping resource region may be changed in a next time domain repetition instance.

FIG. 6 illustrates an example of a system according to certain embodiments. In one embodiment, a system may include multiple devices, such as, for example, UE 610 and NE 620. UE 610 and/or NE 620 may be one or more of a base station, such as an evolved node B (eNB) or next generation node B (gNB), transmit receive point (TRP), a next generation radio access network (NG RAN), a mobility management entity, a serving gateway, a server, and/or any other access node or combination thereof.

One or more of these devices may include at least one processor, respectively indicated as 611 and 621. At least one memory may be provided in one or more of devices indicated at 612 and 622. The memory may be fixed or removable. The memory may include computer program instructions or computer code contained therein. Processors 611 and 621 and memory 612 and 622 or a subset thereof, may be configured to provide means corresponding to the various blocks of FIGS. 1-5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple radio access technologies. Other configurations of these devices, for example, may be provided.

Transceivers 613 and 623 may be a transmitter, a receiver, or both a transmitter and a receiver, or a unit or device that may be configured both for transmission and reception.

Processors 611 and 621 may be embodied by any computational or data processing device, such as a central processing unit (CPU), application specific integrated circuit (ASIC), or comparable device. The processors may be implemented as a single controller, or a plurality of controllers or processors.

Memory 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
5G 5th Generation Wireless System
BWP Bandwidth Part
CC Component Carrier
CDM Code Division Multiplexing
CQI Channel Quality Indicator
C-RNTI Cell Radio Network Temporary Identifier
DCI Downlink Control Information
DL Downlink
DMRS Demodulation Reference Signal
eMBB Enhanced Mobile Broadband
eMTC Enhanced Machine Type Communications
eNB evolved Node B
E-UTRAN Evolved Universal Mobile Telecommunications System Terrestrial Radio Access Network
FDM Frequency Domain Multiplexing
IMSI International Mobile Subscriber Identity
IoT Internet of Things
gNB Next Generation Node B
LTE Long Term Evolution
MCS Modulation and Coding Scheme
MIB Master Information Block
MIMO Multiple Input Multiple Output
MPDCCH Machine Type Communication Physical Downlink Control Channel
MME Mobility Management Entity
MT-EDT Mobile Terminated Early Data Transmission
NAS Non-Access Stratum
NB-IoT Narrowband Internet of Things
NE Network Entity
NPDCCH Narrowband Physical Downlink Control Channel
NR New Radio (5G)
OFDM Orthogonal Frequency Division Multiplex
OTDOA Observed Time Difference of Arrival
PDCCH Physical Downlink Control Channel
PDSCH Physical Downlink Shared Channel
PO Paging Occasion
PRB Physical Resource Block
PUR Preconfigured Uplink Resource
RE Resource Element
RNTI Radio Network Temporary Identifier
RRC Radio Resource Control
RS Reference Signal
RV Redundancy Version
SCS Subcarrier Spacing
SIB System Information Block
SINR Signal to Interference plus Noise Ratio
S-TMSI System Architecture Evolution Temporary Mobile Subscriber Identity
TCI Transmission Configuration Indication
TDM Time Division Multiplexing
TRP Transmit Receive Point
UE User Equipment
URLLC Ultra Reliable Low Latency Communication

We claim:

1. A method, comprising:
configuring, by a user equipment, at least a first transmission configuration index (TCI), a second TCI, and at least two non-overlapping frequency resource regions in a single time domain resource, wherein
the first TCI is associated with at least one of the non-overlapped frequency resource regions,
the second TCI is associated with at least one of the non-overlapped frequency resource regions which is not assigned to the first TCI, and
at least one association of a state of the first TCI, a state of the second TCI, and the at least one non-overlapping resource region is changed in a next time domain repetition instance,
wherein at least one transmit receive point (TRP) is associated with at least one non-overlapping frequency resource with one TCI state for multi-TRP transmissions in a time instance, and the same or some other set of non-overlapping frequency resources in a different time instance wherein the same transport block (TB) repeats with the same TCI state,
wherein the association between each non-overlapped frequency resource and corresponding TCI state of a transport block repetition in a time instance is received by the user equipment as a configuration by a preconfigured pattern,
wherein partitioning of at least one entire frequency resource allocation is configured by higher layer signaling, wherein each downlink control information (DCI) is configured to carry at least one bit map to derive the TCI association with resource portions and related information configured to derive a number of portions, and wherein in a case where the DCI indicated frequency allocation is 60 physical resource block (PRB) and two TRPs use two non-adjacent frequency allocations, wherein 15 PRB is a portioning size of a non-overlapped frequency allocation, wherein each TRP uses two portions.

2. The method according to claim 1, wherein at least one portion size is derived based on at least one bit map received at the user equipment.

3. The method according to claim 1, wherein at least one TCI state used by one TRP matches across different time instances.

4. The method according to claim 1, wherein at least one TCI state used by at least one TRP changes across different time instances and is indicated as a semi-static manner.

5. The method according to claim 1, wherein the association between each non-overlapped frequency resource and corresponding TCI state of a transport block repetition in a time instance is received by the user equipment as a dynamic configuration.

6. The method according to claim 1, wherein at least one dynamic configuration may be related or derived at least based upon at least one indication of the scheduled resources, modulation and coding scheme (MCS), or defined TCI association of the transmission.

7. The method according to claim 1, wherein multiple options for partitioning of the full frequency resource allocation and TCI association are configured using higher layer signaling.

8. The method according to claim 1, wherein at least one dynamic indication is configured to trigger at least one of multiple options for partitioning.

9. The method according to claim 1, wherein the same or different single/multiple demodulation reference signal (DMRS) ports are associated with some or all non-overlapped frequency resource allocations.

10. The method according to claim 1, wherein when a single codeword with one redundancy version (RV) is used across a full resource allocation, a first TRP is configured to use at least one TCI state and at least one associated resource allocation, and a second TRP is configured to use at least one different TCI state and at least one corresponding resource allocation.

11. The method according to claim 1, wherein the full resource allocation is configured to be used in a transport block size (TBS) determination with a single MCS or two MCS/modulation orders, or common overhead assumptions.

12. A method, comprising:
transmitting, by a network entity, at least one configuration to a user equipment with at least a first transmission configuration index (TCI), a second TCI, and at least two non-overlapping frequency resource regions in a single time domain resource, wherein
the first TCI is associated with at least one of the non-overlapped frequency resource region,
the second TCI is associated with at least one of the non-overlapped frequency resource region which is not assigned to the first TCI, and
at least one association of a state of the first TCI, a state of the second TCI, and the at least one non-overlapping resource region is changed in a next time domain repetition instance, wherein at least one transmit receive point (TRP) is associated with at least one non-overlapping frequency resource with one TCI state for multi-TRP transmissions in a time instance, and the same or some other set of non-overlapping frequency resources in a different time instance wherein the same transport block (TB) repeats with the same TCI state, wherein the association between each non-overlapped frequency resource and corresponding TCI state of a transport block repetition in a time instance is received by the user equipment as a configuration by a preconfigured pattern, wherein partitioning of at least one entire frequency resource allocation is configured by higher layer signaling, wherein each downlink control information (DCI) is configured to carry at least one bit map to derive the TCI association with resource portions and related information configured to derive a number of portions, and wherein in a case where the DCI indicated frequency allocation is 60 physical resource block (PRB), and two TRPs use two non-adjacent frequency allocations, wherein 15 PRB is a portioning size of a non-overlapped frequency allocation, and each TRP uses two portions.

13. An apparatus, comprising:
at least one processor; and
at least one memory including computer program code, wherein the at least one memory and the computer program code are configured to, with the at least one processor, cause the apparatus to perform the method of claim 12.

14. An apparatus, comprising:
at least one processor; and
at least one memory including computer program code, wherein the at least one memory and the computer program code are configured to, with the at least one processor, cause the apparatus to perform:
configuring at least a first transmission configuration index (TCI), a second TCI, and at least two non-overlapping frequency resource regions in a single time domain resource, wherein
the first TCI is associated with at least one of the non-overlapped frequency resource regions,
the second TCI is associated with at least one of the non-overlapped frequency resource regions which is not assigned to the first TCI, and
at least one association of a state of the first TCI, a state of the second TCI, and the at least one non-overlapping resource region is changed in a next time domain repetition instance,
wherein at least one transmit receive point (TRP) is associated with at least one non-overlapping frequency resource with one TCI state for multi-TRP transmissions in a time instance, and the same or some other set of non-overlapping frequency resources in a different time instance wherein the same transport block (TB) repeats with the same TCI state,
wherein the association between each non-overlapped frequency resource and corresponding TCI state of a transport block repetition in a time instance is received by the user equipment as a configuration by a preconfigured pattern,
wherein partitioning of at least one entire frequency resource allocation is configured by higher layer signaling, wherein each downlink control information (DCI) is configured to carry at least one bit map to derive the TCI association with resource portions and related information configured to derive a number of portions, and wherein in a case where the DCI indicated frequency allocation is 60 physical resource block (PRB), and two TRPs use two non-adjacent frequency allocations, wherein 15 PRB is a portioning size of a non-overlapped frequency allocation, wherein each TRP uses two portions.

15. The apparatus according to claim 14, wherein at least one transmit receive point (TRP) is associated with at least one non-overlapping frequency resource with one TCI state for multi-TRP transmissions in a time instance.

16. The apparatus according to claim 14, wherein the association between each non-overlapped frequency resource and corresponding TCI state of a transport block repetition in a time instance is received by the apparatus as a configuration by a preconfigured pattern.

* * * * *